US006161026A

United States Patent [19]

Uchida

[11] Patent Number: 6,161,026

[45] Date of Patent: Dec. 12, 2000

[54] METHOD OF SELECTING MENU AND WIRELESS SELECTIVE CALL RECEIVER TO WHICH THE METHOD IS APPLIED

[75] Inventor: Jun Uchida, Shizuoka, Japan

[73] Assignee: NEC Corporation, Tokyo, Japan

[21] Appl. No.: 09/060,536

[22] Filed: Apr. 14, 1998

[30] Foreign Application Priority Data

Apr. 22, 1997 [JP] Japan .................................... 9-104434

[51] Int. Cl.$^{7}$ ........................................................ H04Q 7/32

[52] U.S. Cl. ........................... 455/566; 455/384; 455/575

[58] Field of Search ..................................... 455/566, 550, 455/575, 31.1, 38.1, 38.2, 130, 186.1, 186.2, 38.4; 340/825.44; 345/146, 352, 353, 354, 902

[56] References Cited

U.S. PATENT DOCUMENTS 5,396,264 3/1995 Falcone et al. .......................... 345/146
5,542,103 7/1996 Mottier et al. .......................... 455/566
5,627,531 5/1997 Posso et al. ............................ 345/902
5,703,947 12/1997 Hino et al. .............................. 455/575
5,761,610 6/1998 Sorensen et al. ....................... 455/575
5,786,819 7/1998 Weiser et al. ........................... 345/354
5,960,366 9/1999 Duwaer ................................... 455/566
5,963,143 10/1999 Tada .................................. 340/825.44

FOREIGN PATENT DOCUMENTS 6-6288 1/1994 Japan .
6-244752 9/1994 Japan .
7-123459 5/1995 Japan .
8-63284 3/1996 Japan .
8-130760 5/1996 Japan .
8-186852 7/1996 Japan .
8-237338 9/1996 Japan .
8-265816 10/1996 Japan .
8-328503 12/1996 Japan .
8-340563 12/1996 Japan .
2245091 12/1991 United Kingdom .
2254462 10/1992 United Kingdom .
2293474 3/1996 United Kingdom .
2302196 1/1997 United Kingdom .

OTHER PUBLICATIONS

Japanese Office Action issued Jun. 15, 1999; English–language translation of relevant portions of the Japanese Office Action.

*Primary Examiner*—Reinhard J. Eisenzopf
*Assistant Examiner*—Lester G. Kincaid
*Attorney, Agent, or Firm*—Ostrolenik, Faber, Gerb & Soffen, LLP

[57] ABSTRACT

A wireless selective call receiver includes an operation unit having at least one operation element which is operated by a user. A detecting unit detects a first predetermined operation of the operation element in a normal mode to generate a menu display signal, and detects a second predetermined operation of the operation element in a selection mode to generate an item designation signal. A control unit controls a display unit to display a predetermined type of data in the normal mode. The control unit responds to the menu display signal to set the selection mode and to control the display unit to display a first menu such that items of the first menu are scrolled while each of the items of the first menu is displayed one by one in a predetermined area. The control unit selects a specific one of the items of the first menu in the selection mode in response to the item designation signal inputted from the detecting unit when the specific item is displayed in the predetermined area.

27 Claims, 4 Drawing Sheets

| PROCEDURE | PREVIOUS (CURRENT) SCREEN | OPERATION OF SW 10 | STATE AFTER OPERATION |
|---|---|---|---|
| (1) | CLOCK DISPLAY (WAITING STATE) | PUSHING FOR 1 SEC. OR MORE | MENU SELECTION MODE (AUTOMATIC SCROLL OF MENU SCREEN) |
| (2) | AUTOMATIC SCROLL | PUSHING | MENU SETTING MODE (AUTOMATIC SCROLL OF MENU SCREEN) |
| (3) | AUTOMATIC SCROLL | PUSHING | DETERMINATION OF MENU |

| PROCEDURE | PREVIOUS (CURRENT) SCREEN | OPERATION OF SW 10 | STATE AFTER OPERATION |
|---|---|---|---|
| (1) | CLOCK DISPLAY (WAITING STATE) | PUSHING FOR 1 SEC. OR MORE | MENU SELECTION MODE (AUTOMATIC SCROLL OF MENU SCREEN) |
| (2) | AUTOMATIC SCROLL | PUSHING | MENU SETTING MODE (AUTOMATIC SCROLL OF MENU SCREEN) |
| (3) | AUTOMATIC SCROLL | PUSHING | DETERMINATION OF MENU |

METHOD OF SELECTING MENU AND WIRELESS SELECTIVE CALL RECEIVER TO WHICH THE METHOD IS APPLIED

BACKGROUND OF THE INVENTION

1. Field of the Invention

The present invention relates to a method of selecting a menu and to an electronic device such as a wireless selective call receiver to which the method is applied.

2. Description of the Related Art

Recent wireless selective call receivers are designed to have complex complex functions such as a wireless selection calling function and a message displaying function and has a great number of menus than previous call receivers. The increase of the number of menus tends to be accompanied by an increase in the number of switches.

The realization of the complex functions by the above-mentioned increase of the number of menus is desirable for user convenience. However, the required number of switches tends to increase with the increase of the number of menus. The increase of the number of switches makes it difficult to produce a small sized wireless selective call receiver having the above referenced complex functions. Also, the increase of the number of switches increases the cost of the device.

A conventional technique simplifying a switch operation is described in Japanese Laid Open Patent Disclosure (JP-A-Heisei 6-6288). In the conventional example of the wireless selective call receiver, a reverse direction scrolling switch is used as a back light turning switch when a head portion of a message is displayed, and is used in a normal manner, otherwise.

SUMMARY OF THE INVENTION

The present invention is provided to solve the above-mentioned problems. Therefore, an object of the present invention is to provide a method of selecting a menu while requiring fewer switches than prior art devices.

Another object of the present invention is to provide an electronic device such as a wireless selective call receiver to which the method is applied.

In order to achieve an aspect of the present invention, a wireless selective call receiver includes a display unit, an operation unit including at least one operation element which is operated by a user, a detecting unit for detecting a first predetermined operation of the at least one operation element in a normal mode to generate a menu display signal, and for detecting a second predetermined operation of the at least one operation element in a selection mode to generate an item designation signal, and a control unit for controlling the display unit to display a predetermined type of data in the normal mode, for setting the selection mode in response to the menu display signal, for controlling the display unit in response to the menu display signal to display a first menu such that items of the first menu are scrolled while each of the items of the first menu is displayed one by one in a predetermined area, and for selecting a specific one of the items of the first menu in the selection mode in response to the item designation signal inputted from the detecting unit when the specific item is displayed in the predetermined area.

In this case, the operation unit may include a single operation element.

The first predetermined operation of the at least one operation element may be an operation of the at least one operation element for a time interval longer than a predetermined time interval. Alternatively, the first predetermined operation of the at least one operation element may be clicks of the at least one operation element twice or more times within a predetermined time interval.

Also, the predetermined area may be a part of a screen of the display unit. Alternatively, the predetermined area may be a whole screen of the display unit.

The control unit may further execute processing corresponding to the specific item of the first menu. When a menu has a hierarchical structure and the first menu is a top layer menu, the control unit may control the display unit to display a second menu corresponding to the specific item of the first menu such that items of the second menu are scrolled while each of the items of the second menu is displayed one by one. Also, the control unit may select a specific one of the items of the second menu in the selection mode in response to an item designation signal inputted from the detecting unit when the specific item of the second menu is displayed.

In order to achieve another aspect of the present invention, a method of designating a specific item from a first menu in a wireless selective call receiver, includes the steps of:

- displaying a predetermined type of data in a normal mode;
- operating an operation element in the normal mode;
- detecting a first predetermined operation of the operation element in the normal mode to generate a menu display signal;
- setting a selection mode in the menu display signal;
- displaying a first menu in response to the menu display signal such that items of the first menu are scrolled while each of the items of the first menu is displayed one by one in a predetermined area;
- detecting a second predetermined operation of the operation element in the selection mode to generate a first item designation signal; and
- selecting a specific one of the items of the first menu in the selection mode in response to the first item designation signal generated when the specific item is displayed in the predetermined area.

In order to achieve still another aspect of the present invention, a wireless selective call receiver includes an antenna, a wireless unit for receiving a wireless signal by the antenna to demodulate the received wireless signal, an informing unit, a display unit, an operation unit including at least one operation element which is operated by a user, a detecting unit for detecting a first predetermined operation of the at least one operation element in a normal mode to generate a menu display signal, and a control unit for determining whether the demodulated wireless signal is destined to the wireless selective call receiver, for controlling the informing unit to inform the user of reception of a message contained in the demodulated wireless signal, for controlling the display unit to display a predetermined type of data in the normal mode, for setting a selection mode in response to the menu display signal, for controlling the display unit in response to the menu display signal to display a first menu such that items of the first menu are scrolled while each of the items of the first menu is displayed one by one in a predetermined area.

In this case, the detecting unit may detect a second predetermined operation of the at least one operation element in the selection mode to generate an item designation signal. Also, the control unit may select a specific one of the items of the first menu in the selection mode in response to the item designation signal inputted from the detecting unit when the specific item is displayed in the predetermined area.

In order to achieve yet still another aspect of the present invention, an electronic equipment includes a display unit, an operation unit including at least one operation element which is operated by a user, a detecting unit for detecting a first predetermined operation of the at least one operation element in a normal mode to generate a menu display signal, and a control unit for controlling the display unit to display a predetermined type of data in the normal mode, for setting a selection mode in response to the menu display signal, for controlling the display unit in response to the menu display signal to display a first menu such that items of the first menu are scrolled while each of the items of the first menu is displayed one by one in a predetermined area.

In this case, the detecting unit may detect a second predetermined operation of the at least one operation element in the selection mode to generate an item designation signal. Also, the control unit may select a specific one of the items of the first menu in the selection mode in response to the item designation signal inputted from the detecting unit when the specific item is displayed in the predetermined area.

DESCRIPTION OF THE PREFERRED EMBODIMENTS

Next, an electronic device such as a wireless selective call receiver of the present invention will be described with reference to the attached drawings.

First, the wireless selective call receiver according to the first embodiment of the present invention will be described.

Figures 1, 2:
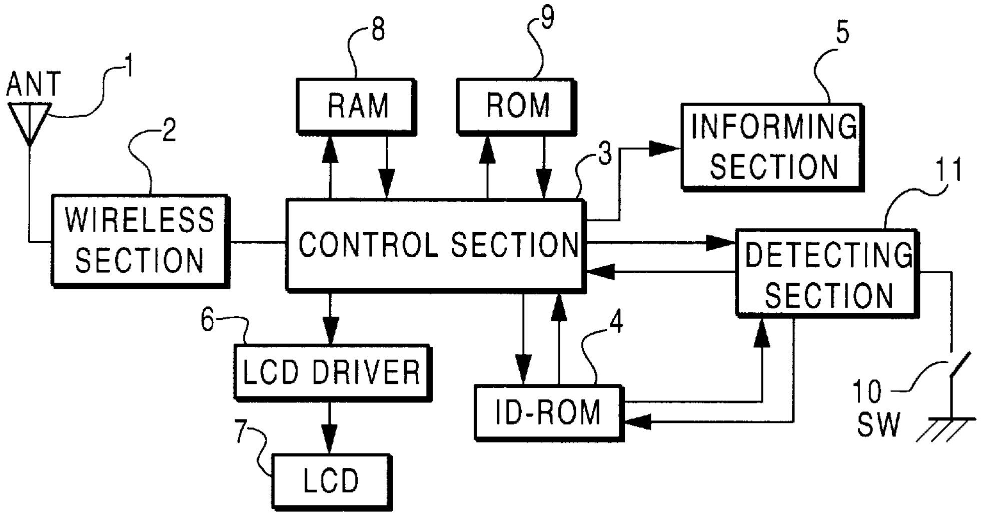
FIG. 1 is a block diagram illustrating the structure of a wireless selective call receiver according to a first embodiment of the present invention.
FIG. 2 is a chart describing the operation of the wireless selective call receiver in response to inputs from a user through a switch.

FIG. 1 is a block diagram illustrating the structure of the wireless selective call receiver according to the first embodiment of the present invention. Referring to FIG. 1, the wireless selective call receiver is composed of an antenna (ANT) 1, a wireless section 2, a control section 3, an ID-ROM 4, an informing section 5, a LCD driver 6, a LCD 7 with a display screen, a RAM 8, a ROM 9, an operation section including a switch (SW) 10 as an operation element, and a detecting section 11 including a timer (not shown).

In the wireless selective call receiver in the first embodiment, a radio signal from a paging system is received by the antenna (ANT) 1 and is sent to the wireless section 2. The wireless section 2 demodulates the wireless signal into base-band data. The demodulated data is sent to the control section 3.

The control section 3 compares, in a normal mode, a self selection call number which is stored in the ID-ROM 4 and a selection call number which is contained in the received demodulated data. When these numbers are coincident with each other, the control section 3 controls the informing section 5 to inform it. When a message is contained in the received data, the control section 3 stores the message in the RAM 8 as a message memory. Also, the control section 3 drives the LCD driver 6 such that the message is displayed on the display screen of the LCD 7. A program which defines the operation of the whole of wireless selective call receiver with the display section is stored in the ROM 9.

The operation section of the wireless selective call receiver with the display section is equipped with the switch 10 as an operation element. The switch 10 is used for both the confirmation of the message which has been received and the selection of a menu. The detecting section 11 is inserted between the control section 3 and the switch 10. The detecting section 11 always monitors a time interval of a pushing or depressing of the switch 10, i.e., a pushing continued time interval, and the number of times of the pushing of the switch 10. The detecting section 11 outputs a mode change signal to the control section 3 when a pushing of the switch 10 is detected for a time interval longer than a predetermined time interval, e.g., one second in this example, or a double click within the predetermined time interval. In response to such a pushing operation, the control section 3 changes the mode from the normal mode to a menu selection mode in response to the mode change signal. Additionally, the control section 3 drives the LCD driver 6 such that the LCD 7 displays a menu.

Additionally, the detecting section 11 outputs an item designation signal to the control section 3 when a pushing of the switch 10 is detected in the menu selection mode while a menu is displayed. The control section 3 selects and sets one of items of the menu in response to the item designation signal.

For example, the confirmation of the message in the normal mode is performed in response to the pushing operation of the switch 10. In other words, the pushing operation time interval of the switch 10 is measured by the timer (not shown) of the detecting section 11. If the pushing operation time interval is equal to or less than 1 second, the detecting section 11 sends to the control section 3 a signal instructing control section 3 to display the message. In the wireless selective call receiver, since it is important to confirm the received message, a single push of the switch 10 within one second is used to set the action for the message confirmation.

On the other hand, pushing the switch 10 for a time interval longer than one second is allocated to the menu selection. Alternatively, twice pushing of the switch 10 within one second (this is referred to as a double-click) may be allocated to this menu selection. Hereinafter, it is supposed that the pushing operation of the switch 10 for a time interval longer than one second is allocated to the menu selection for simplification. It should be noted that one of the pushing operations of this switch 10 which is easy to operate for a user should be stored previously in the ID-ROM 4. When it is detected that the switch 11 has been pushed for a time interval longer than one second, the detecting section 11 sends a mode change signal to the control section 3 indicating that the mode is changed from the normal mode to the menu selection mode.

Next, the operation of the wireless selective call receiver will be described.

FIG. 2 is a schematic diagram of the state change in response to the operation of the switch 10 in case of the selection of a menu in the first embodiment.

Referring to FIG. 2, in the procedure (1), when the switch 10 is operated for a time interval longer than one second (or a double-click operation), the control section 3 changes the mode of the wireless selective call receiver from a clock display mode as a normal mode to a menu selection mode. The control section 3 sends information of menu setting screens one after another to the LCD driver 6 with a predetermined time interval, and each menu setting screen is displayed one after another on the LCD 7. That is, each menu setting screen is automatically scrolled one item by one item. At this time, the control section 3 notifies such a detecting section 11, that the menu setting screens are being automatically scrolled.

In the procedure (2), when the switch 10 is pushed in the above state, the detecting section 11 informs the pushing operation of the switch 10 to the control section 3 regardless of the time interval of the pushing operation of the switch 10. That is, the detecting section 11 outputs an item designation signal to the control section 3. In response to the item designation signal, the control section 3 selects one of items of the menu which are being automatically displayed during the scroll, and sets the selected item.

In the last procedure (3), the control section 3 determines one of the items of the selected menu based on the pushing operation of the switch 10 when a desired function setting screen is displayed while the items of the selected menu are automatically scrolled.

If the selected item in the procedure (2) corresponds to a submenu, the submenu is also displayed while items of the submenu are being automatically scrolled.

Figure 3A:
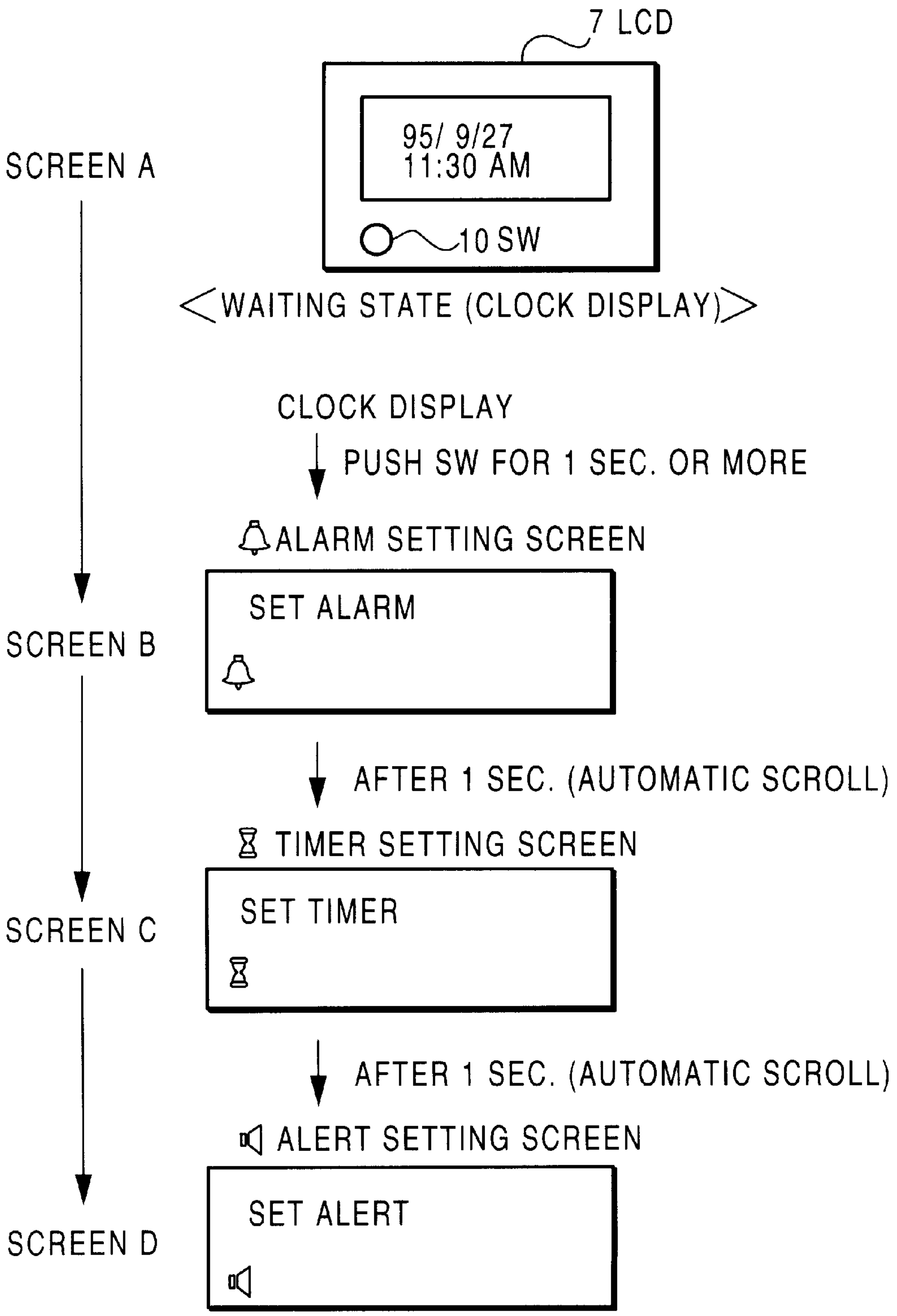
FIGS. 3A and 3B are diagrams illustrating an example of the menu selection in the wireless selective call receiver according to the first embodiment of the present invention.
Figure 3B:
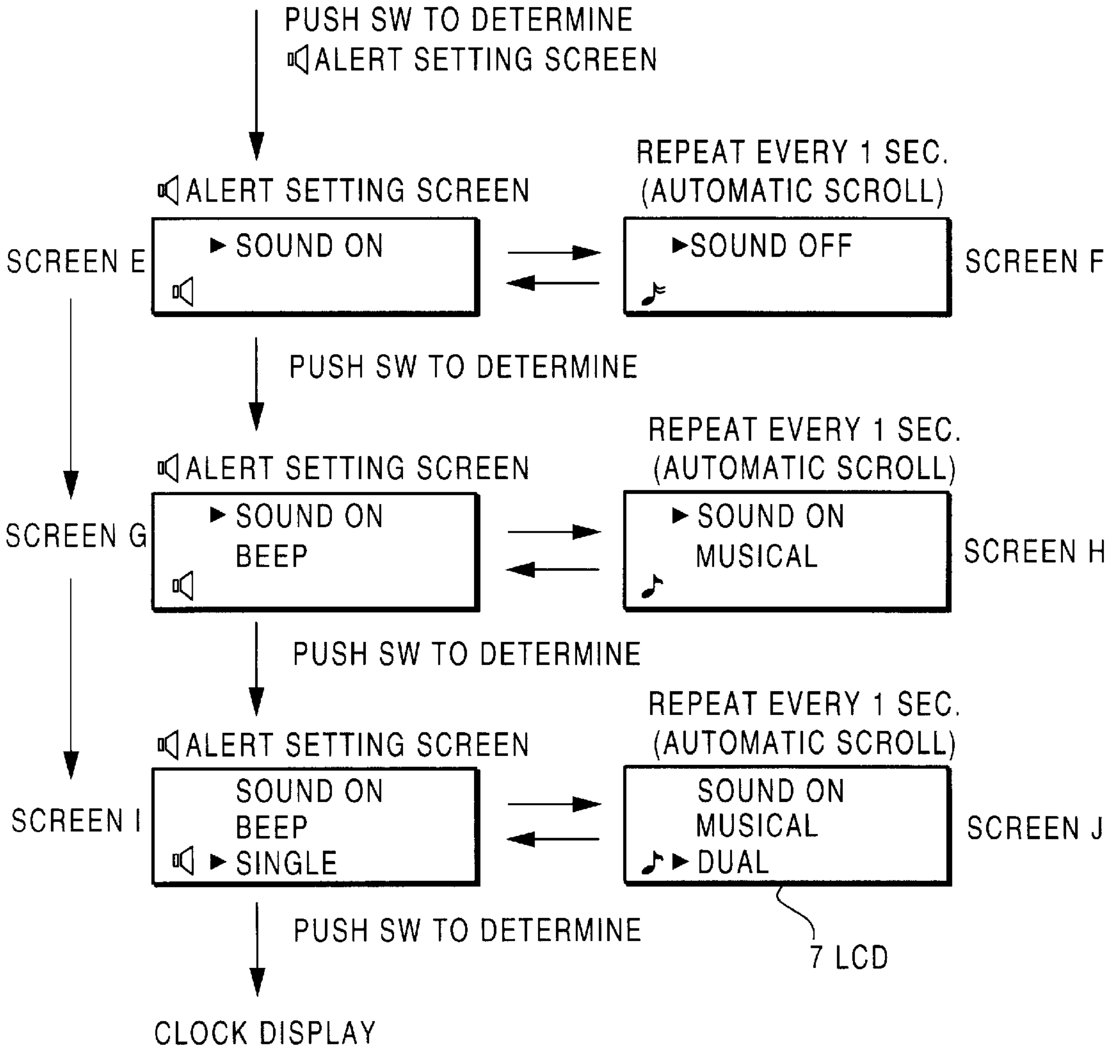

FIGS. 3A and 3B are diagrams illustrating a specific example of the menu selection in the first embodiment.

Referring to FIG. 3A, in the first embodiment, the clock displaying state of the screen A is displayed on the LCD 7 in a normal mode. The normal mode is set when there is no pushing operation of the switch 10 and when the wireless selective call receiver is in a time interval other than a time interval immediately after a message is received.

In case of selection of a menu, the user pushes the switch 10 for a time interval longer than one second (as described above, there may be a case that the switch 10 is double clicked). At that time, an alarm setting screen of the screen B is displayed for one second as a first item of a first menu. Then, the display screen is automatically changed to a timer setting screen of the screen C as a second item of the first menu. This display screen is also displayed for one second. After that, an alert setting screen of the screen D is automatically displayed as a third item of the first menu. As mentioned above, in the menu selection mode, the screens corresponding to the first to third items of the first menu are automatically scrolled, as long as there is not any item designation signal generated based on the pushing operation of the switch 10.

When the switch 10 is pushed in the state in which the last alert setting screen of the screen D is displayed as shown in FIG. 3A, the alert setting menu is selected. Referring to FIG. 3B, the screens from the screen E to the screen J corresponding to items of the selected alert setting menu are shown to describe a method of setting the details of the alert setting menu.

The item "Sound On" is shown in the screen E and the item "Sound Off" is shown in the screen F. The item "Sound On" means that the informing operation is carried out by use of sounding a speaker. On the other hand, the item "Sound Off" means that the informing operation is carried out by use of vibration of a vibrator due to vibration of a motor.

When the alert setting screen is displayed as the last screen D of FIG. 3A, and the switch 10 is pushed the alert setting is selected. At that time, the item "Sound On" of the screen E and the item "Sound Off" of the screen F are automatically and alternately displayed with the time interval of one second. In this case, if the switch 10 is pushed in the state in which the item "Sound On" of the screen E is displayed, the content of the alert setting is determined to be the item "Sound On".

Next, an item "Beep" of a screen G and an item "Musical" of the screen H are automatically and alternately displayed with the time interval of one second. The item "Beep" means that the speaker sounds. The item "Musical" means that the speaker sounds a simple melody. When the switch 10 is pushed in the state in which the item "Beep" of the screen G is displayed, a content of the alert setting is determined to be the item "Beep".

Then, an item "Single" of the screen I and an item "Dual" of the screen J are automatically and alternately displayed with the time interval of one second. The item "Single" means that the speaker sounds with a single frequency. The item "Dual" means that the speaker sounds alternately with two different frequencies. When the switch 10 is pushed in the state in which the item "Single" of the screen I is displayed, the item "Single" is selected as a content of the alert setting.

After this, the control returns to the waiting state (clock display) by the pushing operation of the switch 10.

Overall, the items "Sound On", "Beep" and "Single" are selected by the pushing operation of the single switch only 10, so that the contents of the alert setting menu as one of the menus can be determined.

Next, the wireless selective call receiver according to the second embodiment of the present invention will be described. The structure of the wireless selective call receiver according to the second embodiment is same as that of the first embodiment. Therefore, the description will be omitted.

Figure 4:
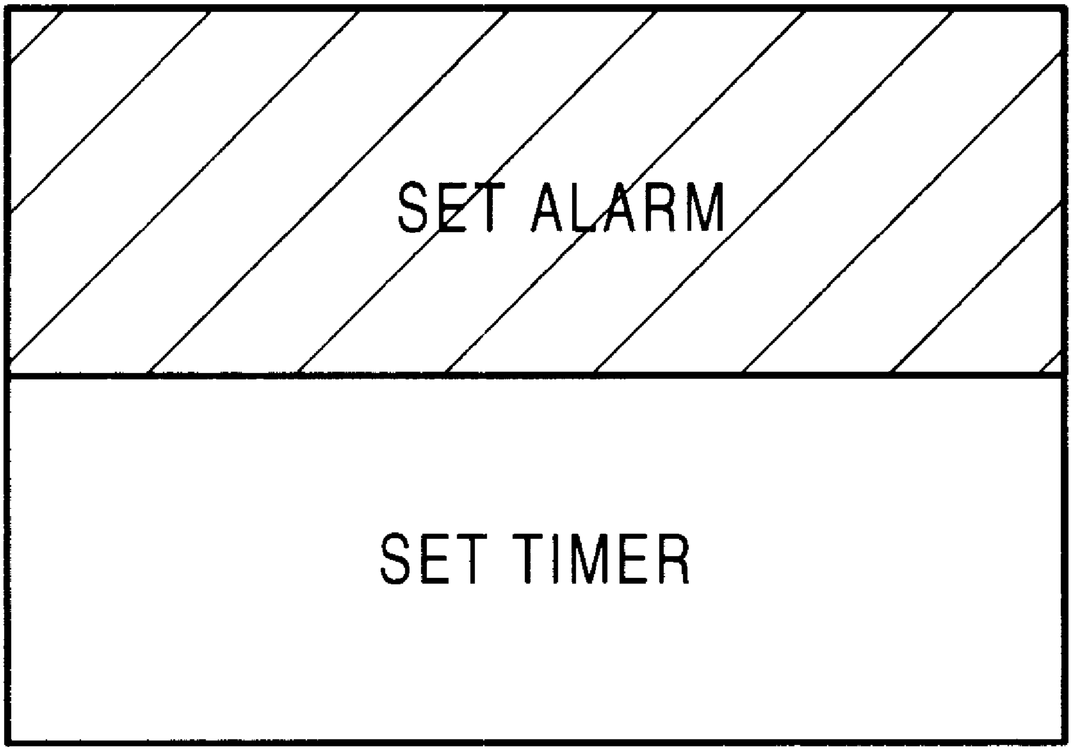
FIG. 4 is a diagram illustrating another example of the menu selection in the wireless selective call receiver according to a second embodiment of the present invention.

In the first embodiment, the whole screen portion of the display screen is used for the selection of a menu or selection of an item of the menu. However, in the wireless selective call receiver in the second embodiment, an upper half area of the display screen of the LCD 7 is used for selection of a menu or selection of an item of the menu, as shown in FIG. 4. When the first item of a menu is displayed in the upper half area of a display screen, the following second item is displayed in the lower half of the display screen. After one second, the second item is displayed in the upper half area of the display screen and the third item is displayed in the lower half area of the display screen. Thus, the screens corresponding to the items of the menu are automatically scrolled with one second interval. In this embodiment, since the next item can be confirmed, there is more conveniences for the user.

Also, a plurality of items of a menu are displayed on a display screen and the plurality of items may be sequentially highlighted with a predetermined time interval to distinguish the active state, instead of the automatic scroll. When the switch is pushed as described above in the state in which one of the items is highlighted, the item may be selected.

As described above, according to the wireless selective call receiver with the display unit of the present invention, the pushing operation of the switch is performed for a time interval longer than a predetermined time interval for the selection of one of items of a menu. Alternatively, a twice pushing operation of the switch within a predetermined time interval, i.e., a double click is performed for the selection of the item of the menu. During the selection of the item of the menu, the items of the menu are automatically scrolled with a predetermined time interval. Thus, a desired one of the items of the menu can be selected or set in response to the pushing operation of the switch in the state in which the desired item of the menu is displayed. Thus, the menu setting operation is improved.

Also, the present invention has one of the features in that the wireless selective call receiver with the display unit can be provided to give the user convenient menu selection, using only a single switch. Therefore, the wireless selective call receiver of the present invention can be implemented with hardware this is small in volume. Also, the wireless selective call receiver with the display unit can be manufactured to have a small size and complex functions so as to match to the needs in the market. Further, the wireless selective call receiver with the display unit can be manufactured with a low cost because the number of electric parts associated with the switch can be reduced.

What is claimed is:

1. A wireless selective call receiver operable in a normal mode and operable in a setting mode, said wireless selective call receiver comprising:

a display;

a switch including at least one operation element operable by a user;

a detecting unit, said detecting unit detects a first operation of said at least one operation element while said wireless selective call receiver is in said normal mode and generates a menu display signal in response thereto, said detecting unit detects a second operation of said operation element while said wireless selective call receiver is in said normal mode and produces a message display signal in response thereto, said second operation being distinct from said first operation, said detecting unit further detects when said user performs at least one of said first and said second operation of said at least one operation element when said wireless selective call receiver is in said setting mode and generates an item designation signal in response thereto; and a control unit, said control unit controls said display to display a predetermined type of data when said wireless selective call receiver is in said normal mode, said control unit controls said display to display a message when said detecting unit produces said message display signal, said control unit controls said wireless selective call receiver to switch to said setting mode and controls said display to sequentially display items of a menu in a predetermined area of said display in response to said menu display signal, and said control unit selects a specific item of said items of said menu in response to said item designation signal.

2. A wireless selective call receiver according to claim 1, wherein said operation unit includes a single operation element.

3. A wireless selective call receiver according to claim 1, wherein said first operation of said at least one operation element is an operation of said at least one operation element for a time interval longer than a predetermined time interval.

4. A wireless selective call receiver according to claim 1, wherein said first operation of said at least one operation element is an operation of said at least one operation element two or more times within a predetermined time interval.

5. A wireless selective call receiver according to claim 1, wherein said predetermined area is a part of a screen of said display.

6. A wireless selective call receiver according to claim 1, wherein said predetermined area is a whole screen of said display.

7. A wireless selective call receiver according to claim 1, wherein said control unit further executes processing corresponding to said specific item.

8. A wireless selective call receiver according to claim 1, wherein:

said menu has a hierarchical structure and said control unit controls said display to display a top layer of said menu in response to said menu display signal; and said control unit controls said display to display another layer of said menu, said another layer corresponding to said specific item of said menu, said control unit controls said display to display said another layer so that items of said another layer are displayed in said predetermined area, and said control unit selects a specific item of said items of said another layer in response to said item designation signal produced by said detecting unit when said specific item of said another layer of said menu is displayed and when said wireless selective call receiver is in said setting mode.

9. The wireless selective call receiver as claimed in claim 1, wherein said control unit controls said display to scroll said items on said display one by one.

10. The wireless selective call receiver as claimed in claim 1, wherein said control unit controls said display to display each of said items in said predetermined area for a predetermined period of time.

11. A method of designating a specific item from a menu in a wireless selective call receiver, said wireless selective call receiver operable in a normal mode and operable in a setting mode, said method comprising the steps of:

displaying data on a display of said wireless selective call receiver when said wireless selective call receiver is in said normal mode;

generating a menu display signal when a user performs a first operation on said operation element while said wireless selective call receiver is in said normal mode;

generating a message display signal when said user performs a second operation on said operation element while said wireless selective call receiver is in said normal mode, said first operation being distinct from said second operation;

switching to said setting mode when said menu display signal is generated;

displaying a message on said display when said message display signal is generated;

sequentially displaying items of said menu on said display in response to said menu display signal sequentially on a predetermined area of said wireless selective call receiver;

detecting at least one of said first and said second operation of said operation element, while said wireless selective call receiver is in said setting mode and generating an item designation signal in response thereto; and selecting said specific item of said items of said menu in response to said item designation signal.

12. A method according to claim 11, wherein said first operation of said operation element is an operation of said at least one operation element for a time interval longer than a predetermined time interval.

13. A method according to claim 11, wherein said first operation of said operation element is an operation of said at least one operation element two or more times within a predetermined time interval.

14. A method according to claim 11, wherein said predetermined area is a part of a screen of said display.

15. A method according to claim 11, wherein said predetermined area is a whole screen of said display.

16. A method according claim 11, further comprising the step of executing processing corresponding to said specific item.

17. A method according to claim 11, wherein:

said menu has a hierarchical structure;

said displaying items of said menu includes displaying a top layer of said menu; and wherein said method further comprises the steps of:

displaying another layer of said menu corresponding to said specific item of said menu on said display;

detecting at least one of said first and said second operation of said operation element while said wireless selective call receiver is in said setting mode and when said another layer of said menu is displayed, thereby generating said item designation signal; and selecting a specific item of said items of said another layer of said menu in response to said item designation signal generated when said specific item of said another layer of said menu is displayed and when said wireless selective call receiver is in said setting mode.

18. The method as claimed in claim 11, wherein said displaying items of said menu includes scrolling said items on said display one by one.

19. The method as claimed in claim 11, wherein said displaying items of said menu includes displaying each of said items in said predetermined area for a predetermined period of time.

20. A wireless selective call receiver operable in a normal mode and operable in a setting mode, said wireless selective call receiver comprising:

an antenna which is effective to receive an input signal;

a demodulator coupled to said antenna said demodulator receives said input signal, demodulates said input signal and produces a demodulated signal in response thereto;

an informing unit;

a display;

a switch including at least one operation element which is operable by a user;

a detecting unit which detects a first operation of said at least one operation element when said wireless selective call receiver is in said normal mode and generates a menu display signal in response thereto, said detecting unit further detects a second operation of said at least one operation element when said wireless selective call receiver is in said normal mode and generates a message display signal in response thereto; and a control unit which determines whether said demodulated signal is destined for said wireless selective call receiver, said control unit controls said informing unit to inform said user of reception of a message contained in said demodulated signal, said control unit controls said display to display a predetermined type of data when said wireless selective call receiver is in said normal mode, said control unit controls said display to display a message when said message display signal is produced, said control unit controls said wireless selective call receiver to switch to said setting mode in response to said menu display signal, said control unit further controls said display to sequentially display items of a menu in a predetermined area of said display in response to said menu display signal.

21. A wireless selective call receiver according to claim 20, wherein:

said detecting unit further generates an item designation signal when said user performs at least one of said first and said second operation of said at least one operation element when said wireless selective call receiver is in said setting mode; and said control unit selects a specific item of said items of said menu in response to said item designation signal.

22. The wireless selective call receiver as claimed in claim 20, wherein said control unit controls said display to scroll said items on said display one by one.

23. The wireless selective call receiver as claimed in claim 20, wherein said control unit controls said display to display each of said items in said predetermined area for a predetermined period of time.

24. An electronic device operable in a normal mode and operable in a setting mode, said electronic device comprising:

a display;

a switch including at least one operation element which is operated by a user;

a detecting unit which detects a first operation of said at least one operation element when said electronic device is in said normal mode and generates a menu display signal in response thereto, said detecting unit further detects a second operation of said at least one operation element when said wireless selective call receiver is in said normal mode and generates a message display signal in response thereto; and a control unit which controls said display unit to display a predetermined type of data when said electronic device is in said normal mode, said control unit controls said display to display a message when said message display signal is produced, said control unit controls said electronic device to switch to said setting mode in response to said menu display signal, said control unit further controls said display unit to sequentially display items of a menu in a predetermined area of said display in response to said menu display signal.

25. An electronic device according to claim 24, wherein:

said detecting unit further generates an item designation signal when said user performs at least one of said first and said second operation of said at least one operation element when said electronic device is in said setting mode; and said control unit selects a specific item of said items of said menu in response to said item designation signal.

26. The electronic device as claimed in claim 24, wherein said control unit controls said display to scroll said items on said display one by one.

27. The electronic device as claimed in claim 24, wherein said control unit controls said display to display each of said items in said predetermined area for a predetermined period of time.

* * * * *